(12) United States Patent
Birnbaum et al.

(10) Patent No.: US 9,703,378 B2
(45) Date of Patent: Jul. 11, 2017

(54) METHOD AND APPARATUS FOR REPRESENTING USER INTERFACE METAPHORS AS PHYSICAL CHANGES ON A SHAPE-CHANGING DEVICE

(75) Inventors: David M. Birnbaum, Oakland, CA (US); Li Jiang, Union City, CA (US); Juan Manuel Cruz-Hernandez, Montreal (CA); Ali Modarres, Mont-Royal (CA); Christophe Ramstein, San Francisco, CA (US); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 1031 days.

(21) Appl. No.: 13/495,235

(22) Filed: Jun. 13, 2012

(65) Prior Publication Data

US 2013/0335454 A1  Dec. 19, 2013

(51) Int. Cl.
*G06F 3/041* (2006.01)
*G09G 5/34* (2006.01)
*G06F 3/01* (2006.01)
*G06F 3/0481* (2013.01)

(52) U.S. Cl.
CPC ........ *G06F 3/016* (2013.01); *G06F 3/04815* (2013.01); *G06F 2203/014* (2013.01); *G06F 2203/04102* (2013.01); *G06F 2203/04809* (2013.01)

(58) Field of Classification Search
CPC .... G06F 3/04865; G06F 3/0487; G06F 3/044; G06F 3/04875; G06F 3/045
USPC .......................................... 345/173–178, 684
See application file for complete search history.

(56) References Cited

U.S. PATENT DOCUMENTS

| | | | |
|---|---|---|---|
| 6,535,201 B1 | 3/2003 | Cooper et al. | |
| 2008/0204420 A1 | 8/2008 | Dunnigan et al. | |
| 2009/0015560 A1 | 1/2009 | Robinson et al. | |
| 2010/0283731 A1 | 11/2010 | Grant et al. | |
| 2011/0102455 A1* | 5/2011 | Temple | 345/619 |
| 2013/0009882 A1* | 1/2013 | Salmela | 345/173 |
| 2013/0076649 A1* | 3/2013 | Myers et al. | 345/173 |
| 2013/0215079 A1* | 8/2013 | Johnson et al. | 345/174 |
| 2013/0265257 A1* | 10/2013 | Jung et al. | 345/173 |

(Continued)

FOREIGN PATENT DOCUMENTS

KR  10-2012-0019471 A  3/2012

OTHER PUBLICATIONS

Linjama, J., et al., "Novel, minimalist haptic gesture interaction for mobile devices," Proceedings of the Third Nordic Conference on Human-Computer Interaction, Nordichi '04, Oct. 23-27, 2004, pp. 457-458.

(Continued)

*Primary Examiner* — Todd Buttram
(74) *Attorney, Agent, or Firm* — Medler Ferro Woodhouse & Mills PLLC

(57) ABSTRACT

An electronic device having a user interface device that has a flexible surface, a haptic output device operatively coupled to the flexible surface and configured to cause a deformation of the flexible surface, and a controller in signal communication with the haptic output device. The controller is configured to trigger the haptic output device to cause the deformation of the flexible surface based on a simulated physical behavior of a virtual element represented on the user interface.

20 Claims, 8 Drawing Sheets

(56) References Cited

U.S. PATENT DOCUMENTS

2013/0314341 A1* 11/2013 Lee et al. .................. 345/173
2014/0015862 A1* 1/2014 Birnbaum .................. 345/647

OTHER PUBLICATIONS

Extended European Search Report, including the Search Opinion, as issued for European Patent Application No. 13171904.9, dated Mar. 28, 2014.
Notice of Preliminary Rejection as issued in Korean Patent Application No. 10-2013-0067004, dated Jan. 27, 2015.

* cited by examiner

METHOD AND APPARATUS FOR REPRESENTING USER INTERFACE METAPHORS AS PHYSICAL CHANGES ON A SHAPE-CHANGING DEVICE

FIELD OF THE INVENTION

The invention relates to a method and apparatus for representing user interface metaphors as physical changes on a shape-changing device.

BACKGROUND OF THE INVENTION

Some electronic user interface devices are able to visually convey a virtual environment, such as a game environment, to a user. Virtual elements of the virtual environment may be displayed on a screen of one of the electronic user interface devices. The user may interact with the virtual elements through metaphors such as touching and dragging the elements on the screen. The virtual environment may be bounded by the screen, and the user may be unable to drag the virtual elements beyond the borders of the screen.

SUMMARY

According to an aspect of the present invention, there is provided an electronic user interface device configured to facilitate user interface metaphors as physical changes. The device may include a user interface comprising a flexible surface, a haptic output device, and a controller. The haptic output device may be operatively coupled to the flexible surface and configured to cause a deformation of the flexible surface. The controller may be in signal communication with the haptic output device, and may be configured to trigger the haptic output device to cause the deformation of the flexible surface. The deformation that is caused may be based on a simulated physical behavior of a virtual element represented on the user interface.

In an embodiment, the physical behavior is a physical interaction of the virtual element with the flexible surface. The virtual element may be visually represented on a screen of the user interface.

In an embodiment, the controller may be configured to visually represent on the screen only a portion of the virtual element. The controller may be configured to simulate the physical interaction of the virtual element with the flexible surface by triggering the haptic output device to cause the deformation to represent another portion of the virtual element that is not visually represented on the screen.

In an embodiment, the rate of the deformation may be based on a rate at which the portion of the virtual element on the screen is visually represented to be moving against the flexible surface.

In an embodiment, the controller is configured to simulate the physical interaction by visually representing on the screen a movement of the portion of the virtual element on the screen in response to a change in the deformation of the flexible surface. In an embodiment, the controller may be configured to adjust a flexibility of the flexible surface based on a simulated resistance of the virtual element.

In an embodiment, the flexible surface is in front of, behind, or part of the screen. The controller may be configured to simulate the physical interaction by enlarging or shrinking the virtual element on the screen and triggering the haptic output device to cause the deformation based on the enlarging or the shrinking.

In an embodiment, the controller is configured to simulate the physical behavior by triggering the haptic output device to cause the deformation based on a physical behavior of a physical element associated with the virtual element. The physical behavior may include an expansion or contraction of the physical element.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
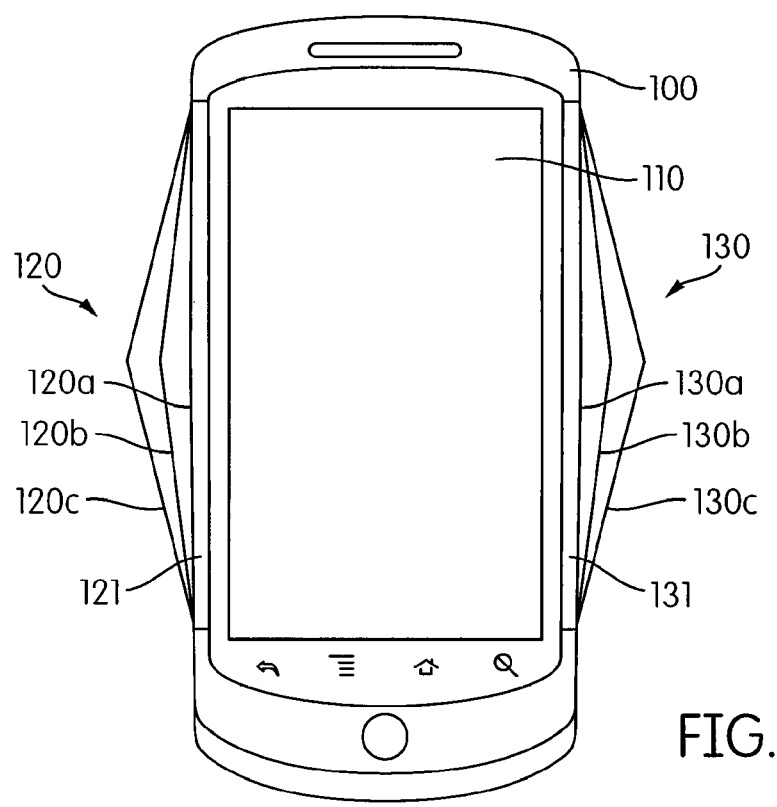
FIG. 1A schematically illustrates an apparatus in accordance with an embodiment of the invention.

FIG. 1A illustrates an embodiment of an electronic user interface device 100 that may facilitate a user interface metaphor that allows a virtual element of a virtual environment to appear to interact with the physical world or otherwise appear to manifest a physical behavior. In some instances, the virtual element may be an object represented visually on screen 110, such as through an icon, animation, video, or other image. The virtual element may appear to extend beyond the screen and into the physical world through a deformation of flexible surface 120 or 130 bordering the screen. The deformation may simulate a physical interaction between the virtual element and flexible surface 120 or 130. The interaction may simulate a force or pressure exerted by the virtual element on flexible surface 120 or 130. The deformation thus allows a virtual element to appear to have a physical behavior that is manifested beyond the screen. In some instances, the virtual element may not be visually represented. For example, the virtual element may represent a visually imperceptible element such as a fluid pressure or force. Deformation of surface 120 or 130 may simulate a pressure or force exerted by the virtual element on the surface. In an embodiment, deformation of flexible surface 120 and 130 may be caused by haptic output device 121 and 131, respectively. In an embodiment, the deformation may be a gross deformation, which may contrast from a deformation resulting from merely touching or lightly pressing a surface. In an embodiment, the gross deformation may be a deformation that a user can see or feel.

In an embodiment, flexible surface 120 or 130 may include any material that is able to undergo deformation, such as a material that can elastically deform up to several micrometers, several millimeters, several centimeters, or tens of centimeters. As illustrated in FIG. 1A, surface 120 and 130 may each be able to be deformed to a plurality of different positions, represented by 120a, 120b, 120c, and 130a, 130b, 130c, respectively. Surface 120 or 130 may be operable to deform along one or more degrees of motion, such as in an outward direction (e.g., away from device 100), an inward direction (e.g., toward device 100), laterally (e.g., in a twisting or stretching motion), or any combination thereof. In an embodiment, either surface 120 or 130 may be operable to deform in a free-form manner, such as in a deformation of a sponge-like material.

In an embodiment, haptic output device 121 or 131 may be an actuator and include a solenoid, a motor, piezoelectric material, fiber composite (e.g., macro-fiber composite) actuator, or any combination thereof. In an embodiment, an actuator may be part of a flexible surface. For example, the piezoelectric material may be part of the flexible surface, and may be configured to deform the surface when an electric signal is applied to the piezoelectric material. In an embodiment, haptic output device 121 or 131 may be a transducer that is able to output a signal based on a force, such as from a user, exerted on flexible surface 120 or 130, respectively.

In an embodiment, haptic output device 121 or 131 may be an electrostatic device. The electrostatic device may be an electrovibrotactile device or any other device that applies voltages and currents instead of mechanical motion to generate a haptic effect. The electrostatic device in this embodiment has at least a conductive layer and an insulating layer. The conducting layer may be any semiconductor or other conductive material, such as copper, aluminum, gold, or silver. The insulating layer may be glass, plastic, polymer, or any other insulating material. The system may operate the electrostatic device by applying an electric signal to the conducting layer. The electric signal may be an AC signal that, in this embodiment, capacitively couples the conducting layer with an object near or touching the surface 120 or 130. The AC signal may be generated by a high-voltage amplifier. The electronic user interface device 100 may also rely on principles other than capacitive coupling to generate a haptic effect. The capacitive coupling may simulate a friction coefficient or texture on the surface 120 or 130. A coefficient of friction is a simulated one in that while the surface 120 or 130 can be smooth, the capacitive coupling may produce an attractive force between an object near the surface 120 or 130 and the conducting layer. The attractive force increases the friction on the surface even when the structure of the material at the surface has not changed. Varying the friction force simulates a change in the coefficient of friction.

The capacitive coupling may also generate a haptic effect by stimulating parts of the object near or touching the surface 120 or 130, such as corpuscles in the skin of a user's finger. The corpuscles in the skin, for example, may be stimulated and sense the capacitive coupling as a vibration or some more specific sensation. For example, the conducting layer can be applied with an AC voltage signal that couples with conductive parts of a user's finger.

In an embodiment, haptic output device 121 or 131 may be configured to generate a low frequency pulse or high frequency vibration at surface 120 or 130, respectively. The low frequency pulse or the high frequency vibration may be used as a haptic effect. In an embodiment, haptic output device 121 or 131 may be configured to cause a flexible surface to deform to various arbitrary three-dimensional contours. For example, haptic output device 121 and 131 may each include a plurality of solenoids, and deformation caused by each solenoid may correspond to a pixel of an image. The plurality of solenoids may cause a surface deformation that conveys height information, color information, or any other information associated with the image.

In an embodiment, device 100 may have a flexible surface that is coplanar with screen 110 and that is part of screen 110 or above or below screen 110. In the embodiment, device 100 may include a haptic output device that may cause deformation of the flexible surface. In an embodiment, a haptic effect may be generated at a surface of screen 110. In an embodiment, screen 110 may be a touch screen.

Figure 1B:
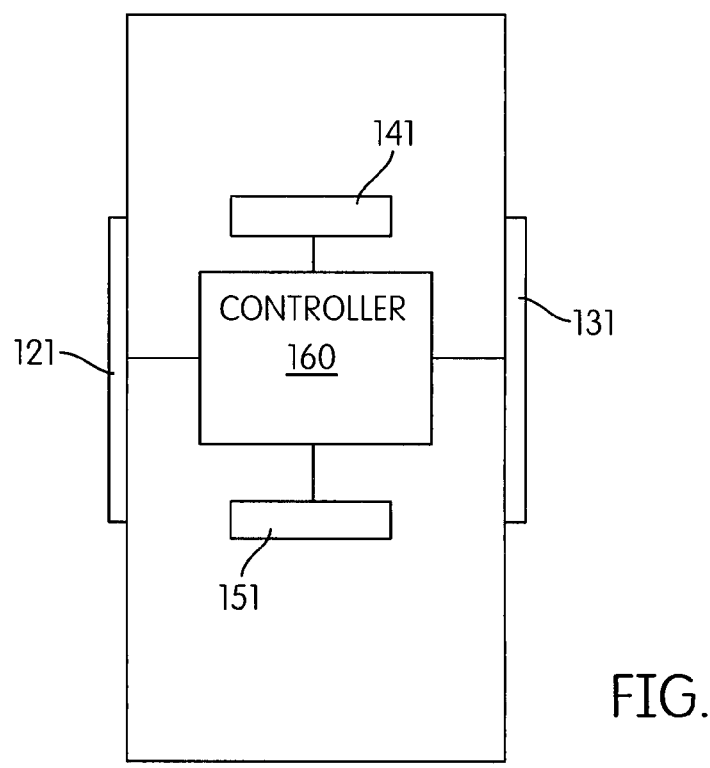
FIG. 1B schematically illustrates components of the apparatus of FIG. 1A.

As illustrated in FIG. 1B, haptic output devices 121 and 131 may be in signal communication with a controller 160, which may be configured to trigger haptic output device 121 or 131 to cause a deformation of flexible surface 120 or 130, respectively. In an embodiment, electronic user interface device 100 may further include haptic output devices 141 and 151, which may be triggered by controller 160 to cause deformation of one or more flexible surfaces. The one or more flexible surfaces may include, for example, the flexible surface that is coplanar with screen 110 and that is above, below, or part of screen 110. The one or more flexible surfaces may include, for example, a flexible surface on a back side of device 100. Haptic output devices 141 and 151 may cause deformations of different flexible surfaces, or may together cause a deformation of the same flexible surface.

Figure 2A:
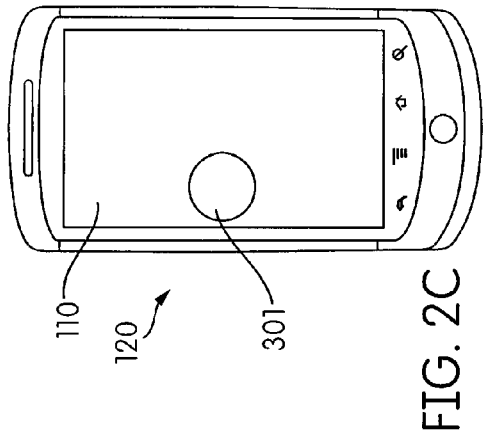
FIGS. 2A-2G illustrate deformations that simulate physical behavior of a virtual element represented on a user interface of the apparatus of FIG. 1A.

FIGS. 2A-2G illustrate a user interface metaphor that may allow a virtual environment to appear to extend into a surrounding physical space. The virtual environment may be part of a game, product demonstration, or any other application. As illustrated in FIG. 2A, the virtual environment may include a virtual ball. The virtual ball may have a portion 301 that is visually represented on screen 110 (i.e., have an on-screen portion 301). To extend the virtual environment into the physical space beyond screen 110, flexible surface 120 may be deformed to represent an off-screen portion of the virtual ball. The deformation may simulate a physical interaction such as flexible surface 120 being pushed by a portion of the virtual ball that lies beyond screen 110. In an embodiment, the simulation may include a direct mapping between the deformation of surface 120 and the simulated interaction. For example, flexible surface 120 may be deformed to have a shape and size substantially matching how a physical ball with similar physical behavior would deform surface 120. The shape may be a bowed shape, for example, while the size may correspond to how much of the virtual ball extends beyond screen 110. Surface 120 may be deformed at a location where on-screen portion 301 of the virtual ball borders surface 120. In an embodiment, the simulation may include a representative mapping between the deformation of surface 120 and the simulated interaction. For example, deformation of flexible surface 120 based on the representative mapping may still have a shape similar to that in a direct mapping, but may have a size that is substantially bigger or substantially smaller than that in a direct mapping. In another example, deformation of flexible surface 120 based on the representative mapping may have a shape that does not depend on how a similar physical element would deform surface 120.

Figure 2D:
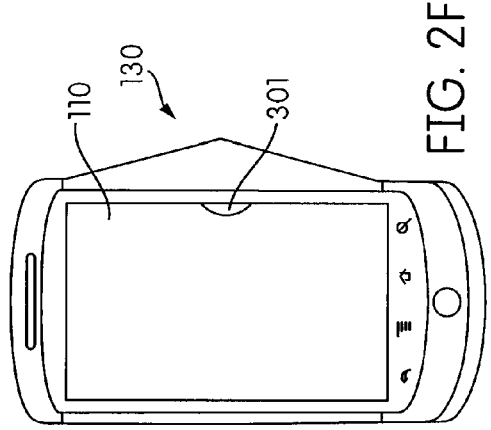
Figure 2B:
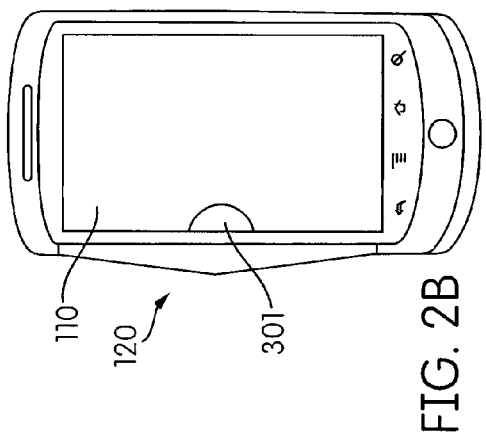

FIG. 2B further illustrates the simulated physical interaction between surface 120 and the virtual ball. In one example, deformation of surface 120 may be reduced in response to on-screen portion 301 of the virtual ball being shown to move away from surface 120. The rate at which the deformation is reduced may substantially match the rate at which the virtual ball is shown to be moving away from surface 120.

In one example, the virtual ball may be shown to be moving away from surface 120 in response to a force that reduces the deformation of surface 120. The force may come from a user, such as from a user's hand squeezing surface 120 inward. The rate or amount at which the virtual ball moves on screen 110 may be based on a duration, magnitude, or combination thereof of the force. The duration or magnitude may be sensed by, for example, a transducer that is operatively coupled to surface 120. A direction at which the virtual ball moves on screen 110 may be based on a direction of the applied force.

In one example, movement of the virtual ball may be rendered simultaneously with a change in the deformation of surface 120. In such an example, the movement of the virtual ball or the change in the deformation of surface 120 may occur automatically or in any other manner that does not require user interaction.

Figure 2E:
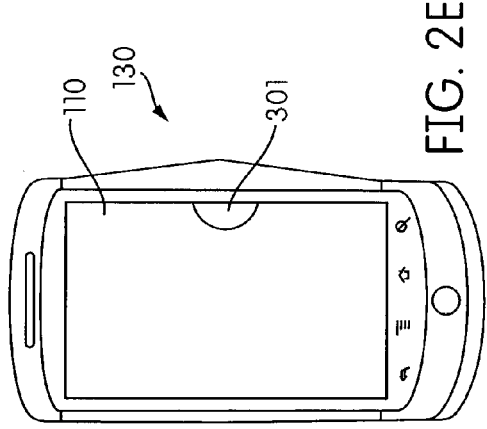
Figure 2C:
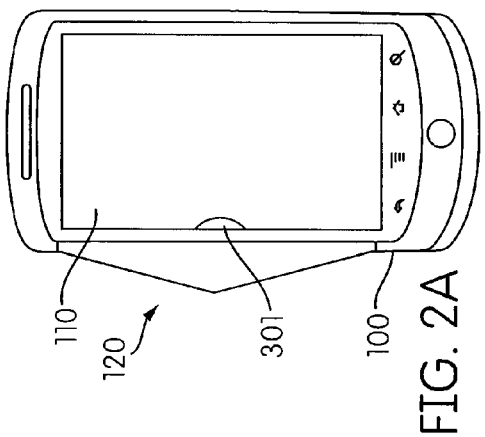
Figure 5B:
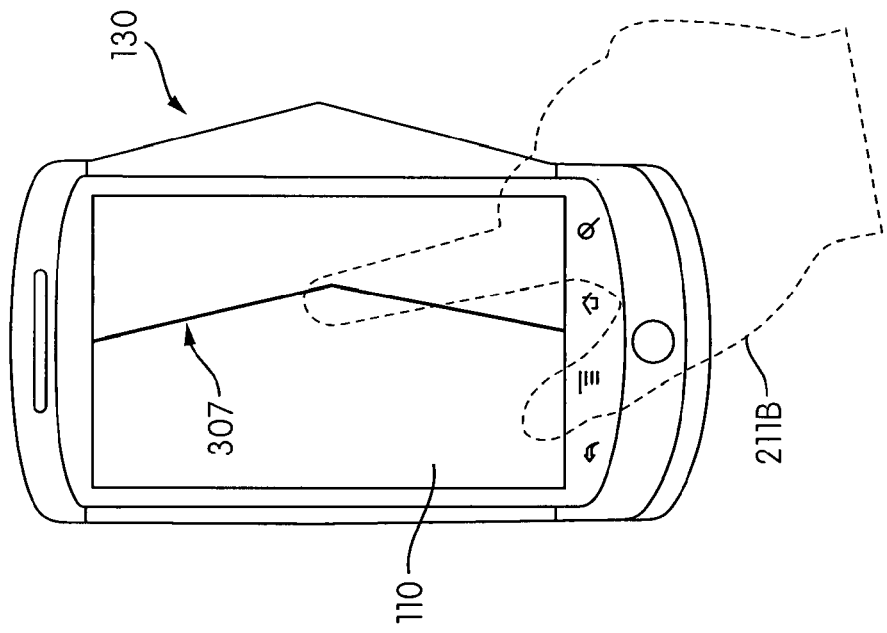
FIGS. 5A-5B illustrate deformations that simulate physical behavior of a virtual element represented on a user interface of the apparatus of FIG. 1A.
Figure 5A:
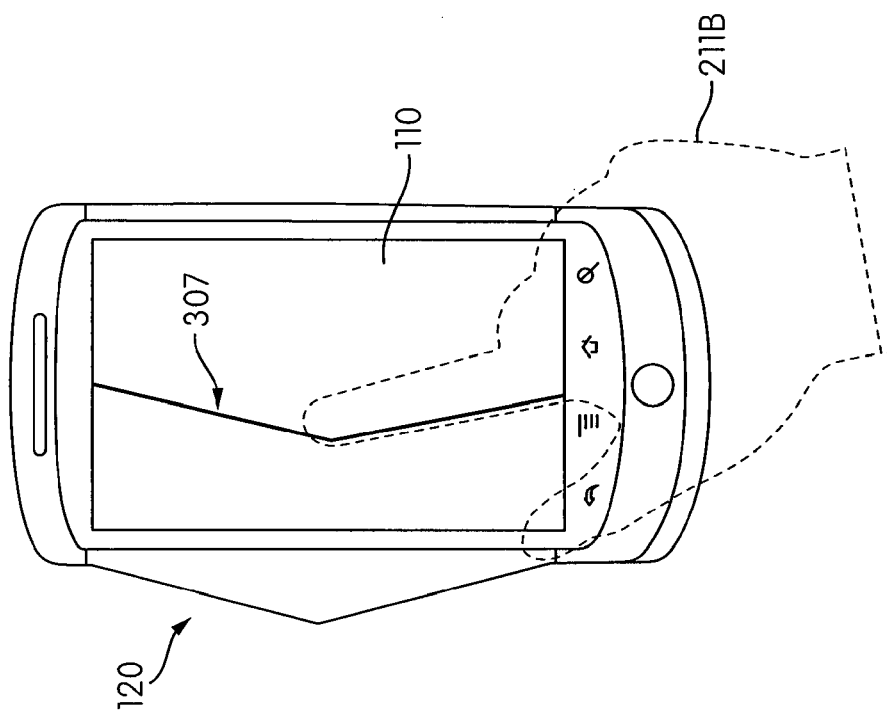

As illustrated in FIGS. 2C and 2D, flexible surfaces 120 and 130 may be undeformed when the virtual ball is shown to be away from a border of screen 110 or, more generally, to be completely on screen 110. In an embodiment, as illustrated in FIGS. 5A and 5B and discussed below, flexible surface 120 or 130 may be deformed even when a virtual element is shown to be completely on screen 110. The deformation may simulate a physical interaction that does not require contact between the virtual element and flexible surface 120 or 130, or may simulate the virtual element moving toward a front or back of device 100.

Figure 2F:
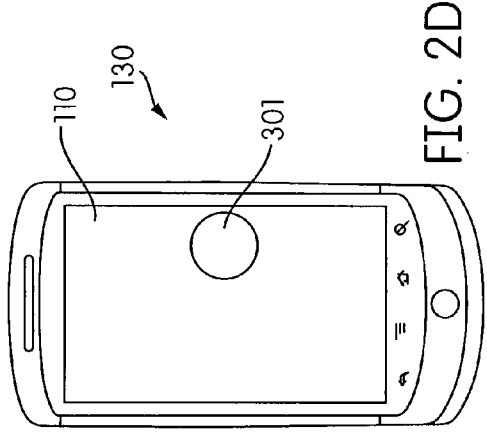

As illustrated in FIGS. 2E and 2F, flexible surface 130 may be deformed to simulate interaction with an off-screen portion of the virtual ball. The simulation may include a direct mapping between the deformation and the simulated interaction with the off-screen portion of the virtual ball, or may include a representative mapping between the deformation and the interaction. In an embodiment, a rate or amount of deformation of flexible surface 130 may be based on a rate at which the virtual ball is shown to approach flexible surface 130. In an embodiment, a rate or amount of deformation of flexible surface 130 may be based on a simulated or real stiffness of surface 130. For example, a higher simulated stiffness may cause surface 130 to be deformed less than with a lower simulated stiffness. In an embodiment, the real or simulated stiffness may affect how the virtual ball behaves on screen 110. For example, the virtual ball may be shown to be slowed down by surface 130 at a rate that is based on the simulated or real stiffness of the surface.

Figure 2G:
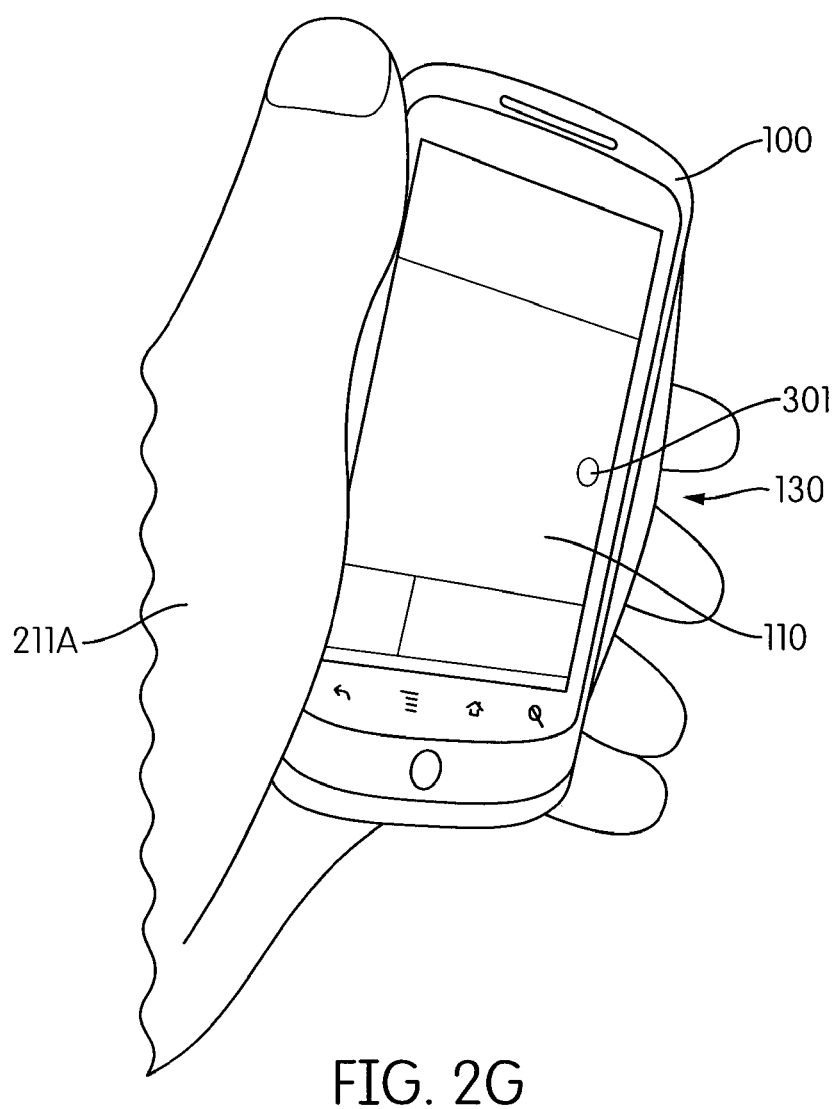

In an embodiment, a rate or amount of deformation of flexible surface 130 may be based on a force applied against surface 130, such as from a user squeezing or otherwise pushing on the surface. For example, as illustrated in FIG. 2G, if device 100 is tightly gripped by the user's hand 211A, flexible surface 130 may be able to undergo deformation of only a few millimeters or centimeters, and movement of the virtual ball may be shown to decelerate rapidly at surface 130. If the applied force causes a deformation of surface 130, such as through user's hand 211A squeezing surface 130 inward, the virtual ball may be shown to move in the direction of the applied force. This movement may simulate, for example, surface 130 pushing the virtual ball toward surface 120.

In an embodiment, flexible surface 120 or 130 may have a simulated or real spring-like property, and movement of the virtual ball on screen 110 may be based on the simulated or real spring-like property. For example, a deformed flexible surface 120 or 130 may be simulated to push back on the virtual ball in a spring-like manner. The virtual ball may then be simulated to bounce between spring-like surfaces 120 and 130 without user interaction. In an embodiment, flexible surface 120 or 130 may be simulated to be inelastic and may retain its deformed shape even after a virtual element is shown to have moved away from or otherwise stopped interacting with the surface. The simulated inelastic property may simulate, for example, a dented surface.

In an embodiment, a real stiffness of flexible surface 120 or 130 may be adjustable. For example, one or more haptic output devices, such as haptic output devices 121 and 131, may be triggered by controller 160 to resist a change in deformation. Adjustment of the real stiffness of surface 120 or 130 may simulate a physical property of the virtual environment, such as a simulated resistance to movement. For example, after surface 130 is deformed, as illustrated in FIG. 2F, one or more haptic output devices may be configured to resist an inward force applied against surface 130, such as from a user squeezing device 100. The resistance to the change in deformation may simulate to the user a mass of the virtual ball. A more massive ball may be simulated to have a greater resistance to being pushed. In one example, the resistance to the change in deformation may simulate a viscosity of a virtual fluid. A more viscous fluid may be simulated to have a greater resistance to being compressed.

Although FIG. 2A-2G illustrate the virtual ball as being at least partially represented on screen 110, in some embodiments a virtual element may be temporarily or permanently represented completely off-screen.

Figure 3:
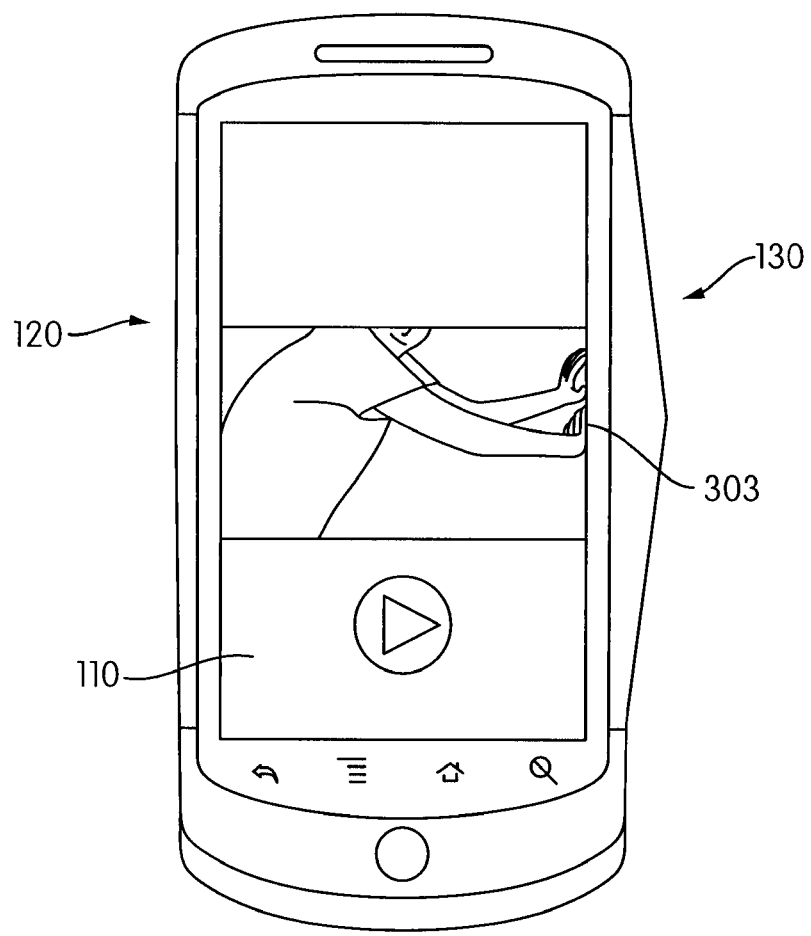
FIG. 3 illustrates a deformation that simulates physical behavior of a virtual element represented on a user interface of the apparatus of FIG. 1A.

FIG. 3 illustrates a simulated physical interaction between a virtual element, such as a user visually represented on a video on screen 110, and flexible surface 130. Flexible surface 130 may represent, for example, a wall or other surface on which the user in the video is pushing. Deformation of surface 130 may be based on an amount of displacement on the wall or other surface, a magnitude of force being exerted on the wall or other surface, or any combination thereof.

Figure 4C:
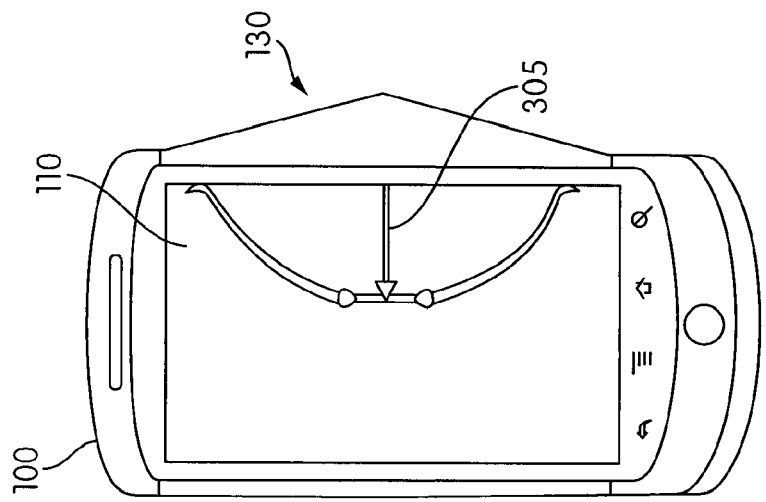
FIGS. 4A-4C illustrate deformations that simulate physical behavior of a virtual element represented on a user interface of the apparatus of FIG. 1A.
Figure 4B:
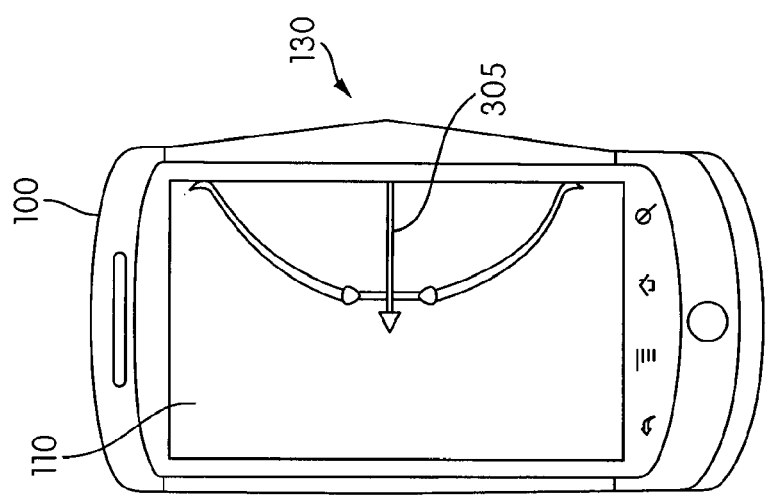
Figure 4A:
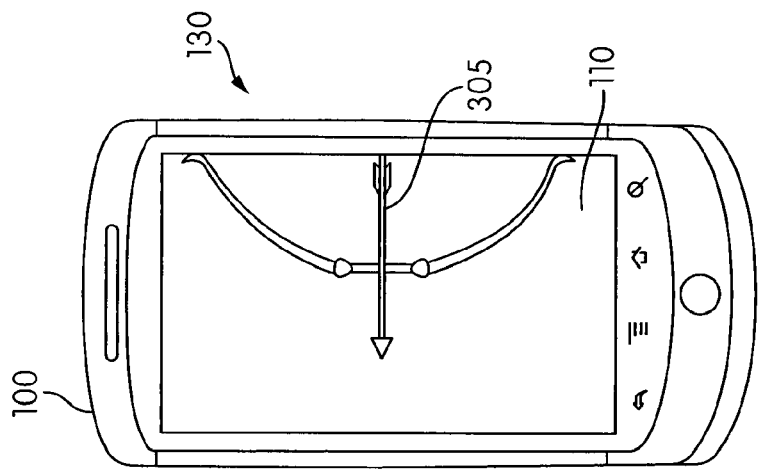

FIGS. 4A-4C illustrate a game in which surface 130 may be deformed to simulate interaction with off-screen portions of a virtual arrow and virtual bow. The off-screen portion of the virtual bow may represent a bow string, while the off-screen portion of the virtual arrow may complement on-screen portion 305 of the virtual arrow. In an embodiment, surface 130 may be deformed in response to a movement of the virtual arrow toward surface 130. The virtual arrow may be moved through a touch input applied over on-screen portion 305. The deformation may simulate the virtual arrow and virtual bow string being pulled.

In an embodiment, the virtual arrow may be shown to move on screen 110 in response to a user input received at surface 130. For example, a user may pull on surface 130 or stroke surface 130 in an outward direction to deform surface 130 in that direction. In response, on-screen portion 305 of the virtual arrow may be shown to be pulled in that direction. In an embodiment, the deformation of surface 130 may be based on a direct mapping that simulates how an off-screen portion of the arrow and bow would deform surface 130, or may be based on a representative mapping in which a shape or size of the deformation does not depend on how a similar physical bow or arrow would deform surface 130. In an embodiment, if surface 130 represents the bow string, the deformation may simulate deformation or any other physical behavior of the virtual bow string.

To simulate the virtual arrow being shot by the virtual bow, on-screen portion 305 of the arrow may be shown to move, and deformation of surface 130 may be reduced. The on-screen movement and change in the deformation may be simultaneous, or one may cause the other. To simulate an effect of tension on the virtual bow, a greater amount of deformation of surface 130 before the release may cause a faster on-screen movement of the virtual arrow and a higher rate of reduction of the deformation of surface 130 after the release.

In an embodiment, a flexible surface that is coplanar with (e.g., above, below, or part of) screen 110 may be deformed to simulate a virtual element coming out of the screen or recessing into the screen. The flexible surface may be on a front side, back side, or both sides of device 100. In an embodiment, the flexible surface may be deformed to simulate a three-dimensional contour. For example, the surface may be deformed based on a simulated contour of a virtual keyboard. In an embodiment, an on-screen portion of the virtual element may increase in size to simulate to a user that the virtual element is approaching the user. In response, the coplanar flexible surface may be deformed in a direction that is toward the user. The deformation may simulate a physical interaction between the virtual element and the coplanar flexible surface. The simulation may include a direct mapping or a representative mapping between the deformation and the simulated physical interaction. For example, deformation based on the direct mapping may have an amount of deformation that corresponds to a size of on-screen portion of the virtual element, and may have a rate of deformation that corresponds to a rate at which the size of the on-screen portion increases or decreases. The virtual element may be shown to be completely on screen 110 or may be shown to have a portion that extends beyond the boundary between screen 110 and surface 120 or 130.

FIGS. 5A-5B illustrate deformations of flexible surface 120 and 130 based on a virtual string, which may be shown to be completely on screen. In an embodiment, the deformation simulates a physical interaction between on-screen portion 307 of a virtual string and flexible surfaces 120 and 130. The simulated physical interaction may be an interaction that does not require contact between the interacting elements. For example, the physical interaction may represent a magnetic force or fluid pressure generated by the virtual element and exerted on surface 120 or 130, or may represent any other interaction that does not require contact between interacting elements. The simulation may include a direct mapping between the deformation and the interaction, or may include a representative mapping.

In an embodiment, surfaces 120 and 130 of device 100 may each represent the virtual string, and the deformation shown in FIGS. 5A-5B may simulate a physical behavior such as movement of the virtual string. In this embodiment, surface 120 or 130 may be deformed to match or substantially match a shape, size, or combination thereof of the virtual string shown on screen 110.

In an embodiment, the deformation may be based on a physical behavior of a physical element associated with the virtual element. For example, surfaces 120 and 130 may be deformed based on a user's heartbeat or rate of breathing. Device 100 may thus embody a virtual heart that is associated with the user's physical heart or physical blood pressure. Expansions and contractions of the user's heart or highs and lows of the user's blood pressure may be reflected in expansions and contractions of surfaces 120 and 130, which may represent a physical state (e.g. expanded or contracted) of the user's heart.

Figure 6:
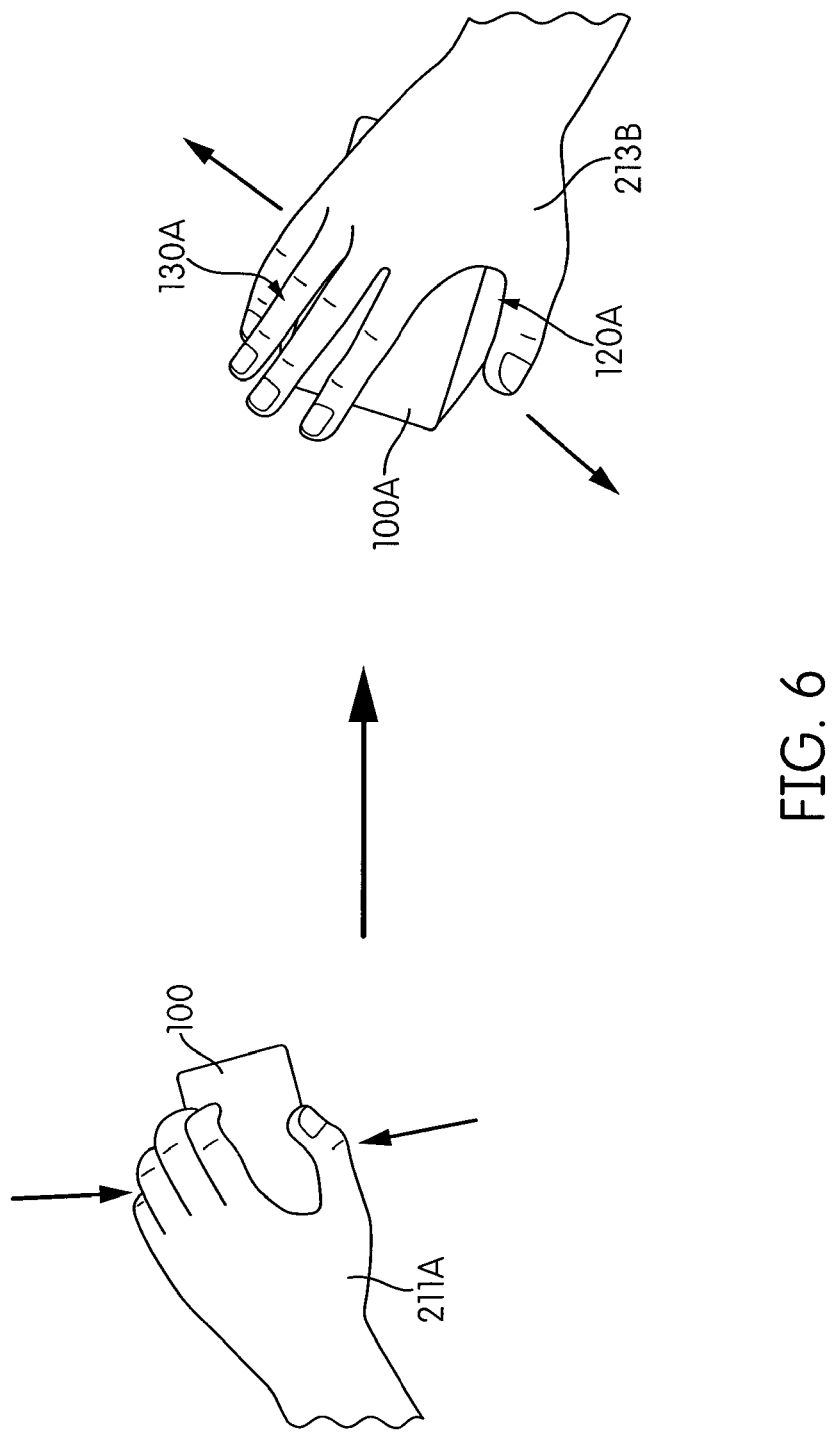
FIG. 6 illustrates a deformation that simulates physical behavior of a virtual element represented on a user interface of the apparatus of FIG. 1A.

FIG. 6 illustrates an example in which surfaces 120 and 130 may be deformed based on a handshake or hand squeeze gesture, as part of a user interface metaphor in which physical behavior manifested on one device can be experienced on another device. For example, when a hand 211A of a first user squeezes or otherwise applies a force on device 100, a hand 213B of a second user may experience a deformation on device 100A in response. The deformation on device 100A may be based on a signal from device 100 indicative of the force that was applied.

In an embodiment, device 100 may represent a virtual fluid that is compressed by the force applied by hand 211A of the first user. Device 100 may transmit a signal indicative of the force to device 100A. Device 100A may also represent a virtual fluid, and may interpret the signal as a transfer of pressure from the compressed virtual fluid represented on device 100 to the virtual fluid represented on virtual device 100A. In response, surfaces 120A and 130A of device 100A may be deformed outward to simulate the virtual fluid of device 100A being expanded by the pressure transfer.

In an embodiment, device 100A may represent a virtual copy of physical device 100 or may represent any other virtual element associated with device 100. Physical behavior such as deformations of surfaces 120 and 130 on device 100 may be reflected by deformations on device 100A. For example, when hand 211A of the first user squeezes surfaces 120 and 130 inward, surfaces 120A and 130A of device 100A may be deformed inward in response. The deformations may facilitate a metaphor in which two users may physically interact through their interface devices. The interactions may mimic, for example, a handshake or hand holding. The latter may be used to convey affection or other emotions between users. In one example, deformation in device 100A may be based on a distance to device 100. For example, a rate or amount of deformation of surfaces 120A and 130A may decrease linearly with distance between the two devices.

Figure 7B:
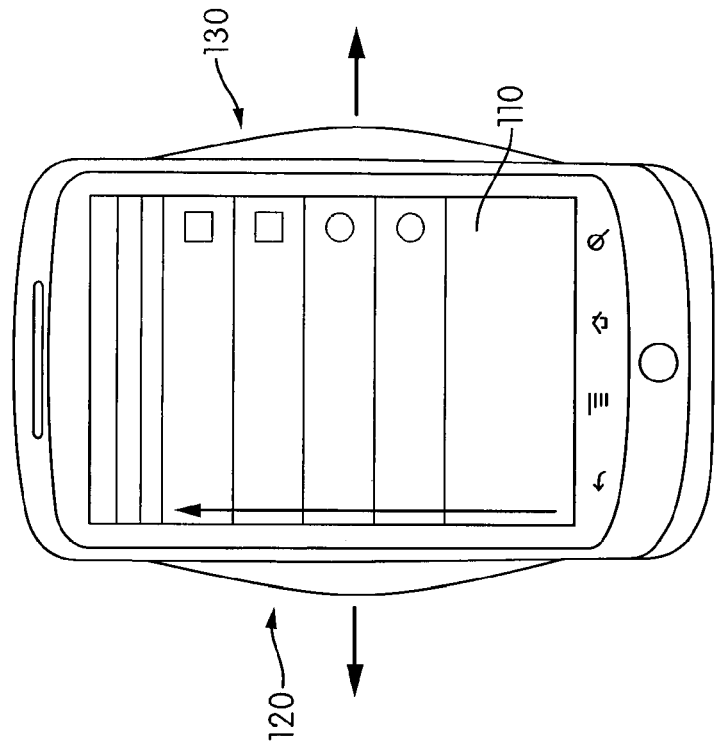
FIGS. 7A-7B illustrate deformations that simulate physical behavior of a virtual element represented on a user interface of the apparatus of FIG. 1A.
Figure 7A:
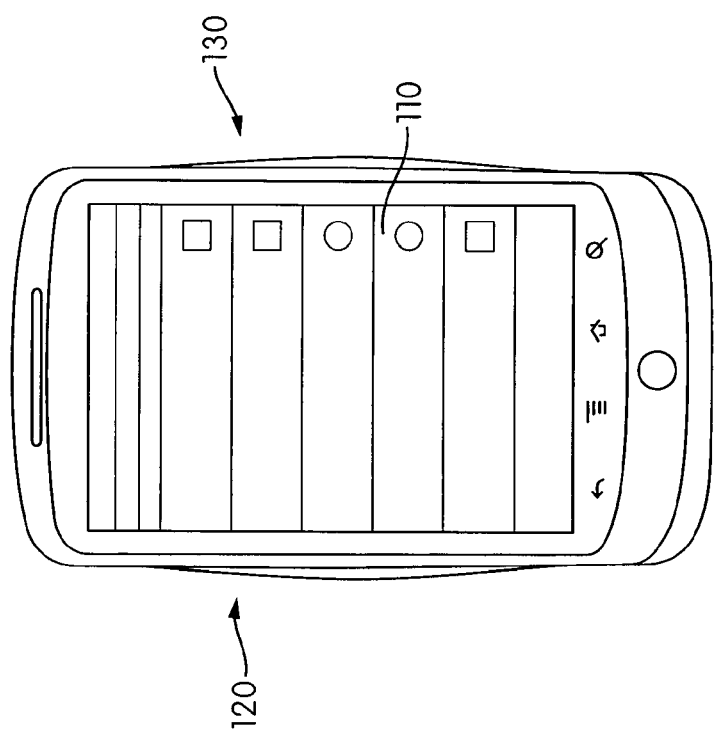

In an embodiment, a deformation of surface 120 or 130 may simulate a physical behavior of a virtual menu (e.g., an options menu), virtual page (e.g., a webpage), virtual document, or any other virtual element with a visually represented portion that can be scrolled to a position that is off screen 110. For example, scrolling an on-screen portion of the virtual menu, page, or document to the left may cause a deformation of surface 120. The deformation may simulate a portion of the virtual element being scrolled to a position on the left of screen 110. An amount of deformation, rate of deformation, or combination thereof may be based on a scrolling rate, a simulated position of the portion that is scrolled off screen, or any combination thereof. If the scrolling behavior moves the virtual menu, page, or document upward or downward, as illustrated in FIG. 7A and FIG. 7B, the deformation of surface 120 or 130 may still more generally represent the scrolling behavior. For example, surface 120 or 130 may still be deformed to represent a scrolling speed or to represent how close the on-screen portion is to the top or bottom of the virtual element, page, or document.

In the embodiments described above, device 100 may be a mobile device, a remote control, a tablet, desktop, or notebook computer, electronic display, or any other user interface device. Controller 160 may include a microprocessor, logic circuit, or any other computing device.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electronic device, comprising:
   a user interface comprising a flexible surface;
   a haptic output device operatively coupled to the flexible surface and configured to cause a deformation of the flexible surface;
   a screen configured to visually represent movement of a virtual element from one portion of the screen to another portion of the screen; and
   a controller in signal communication with the haptic output device and configured to trigger the haptic output device to cause the deformation of the flexible surface based on a simulated physical interaction of the virtual element represented on the screen with the flexible surface, the deformation of the flexible surface corresponding to movement of the virtual element.

2. The electronic device of claim 1, wherein the controller is configured to visually represent on the screen only a portion of the virtual element, and wherein the controller is configured to simulate the physical interaction of the virtual element with the flexible surface by triggering the haptic output device to cause the deformation to represent another portion of the virtual element not visually represented on the screen.

3. The electronic device of claim 2, wherein the controller is configured to trigger the haptic output device to cause a size of the deformation to be based on a size of the another portion of the virtual element not visually represented on the screen.

4. The electronic device of claim 2, wherein the controller is configured to trigger the haptic output device to cause a rate of the deformation to be based on a rate at which the portion of the virtual element is visually represented to be moving against the flexible surface.

5. The electronic device of claim 2, wherein the controller is configured to simulate the physical interaction by visually representing on the screen a movement of the portion of the virtual element in response to a change in the deformation of the flexible surface.

6. The electronic device of claim 5, wherein the controller is configured to simulate the physical interaction by adjusting a flexibility of the flexible surface based on a simulated resistance of the virtual element.

7. The electronic device of claim 1, wherein the controller is further configured to simulate a physical behavior by triggering the haptic output device to cause the deformation based on a physical behavior of a physical element associated with the virtual element.

8. The electronic device of claim 7, wherein the physical behavior comprises an expansion or a contraction of the physical element.

9. The electronic device of claim 1, wherein the haptic output device comprises an actuator.

10. A method for representing a user interface metaphor applied to a user interface, the method comprising:
    visually representing movement of a virtual element from one portion of a screen of the user interface to another portion of the screen; and
    simulating a physical interaction of the virtual element represented on the screen with a flexible surface of the user interface by triggering a haptic output device operatively coupled to the flexible surface of the user interface to cause a deformation of the flexible surface corresponding to movement of the virtual element.

11. The method of claim 10, wherein the visually representing the virtual element on the screen comprises visually representing on the screen only a portion of the virtual element, and wherein simulating the physical interaction of the virtual element with the flexible surface comprises triggering the haptic output device to cause the deformation to represent another portion of the virtual element not visually represented on the screen.

12. The method of claim 11, wherein the triggering the haptic output device to cause the deformation comprises causing a size of the deformation to be based on a size of the another portion of the virtual element not visually represented on the screen.

13. The method of claim 11, wherein the triggering the haptic output device to cause the deformation comprises causing a rate of the deformation to be based on a rate at which the portion of the virtual element is visually represented to be moving against the flexible surface.

14. The method of claim 11, wherein the simulating the physical interaction comprises visually representing on the screen a movement of the portion of the virtual element in response to a change in the deformation of the flexible surface.

15. The method of claim 14, wherein the simulating the physical interaction comprises adjusting a flexibility of the flexible surface based on a simulated resistance of the virtual element.

16. The method of claim 10, wherein the simulating the physical interaction comprises triggering the haptic output device to cause the deformation based on a physical behavior of a physical element associated with the virtual element.

17. The method of claim 16, wherein the physical behavior comprises an expansion or a contraction of the physical element.

18. A method for representing a user interface metaphor applied to a user interface, the method comprising: representing a behavior of a virtual element visually represented on a screen of the user interface by triggering a haptic output device operatively coupled to a flexible surface of the user interface to cause a deformation of the flexible surface, wherein the behavior comprises movement of the virtual element on the screen of the user interface.

19. The method of claim 18, wherein the behavior includes scrolling of the virtual element on the screen, and wherein representing the behavior comprises triggering the haptic output device to cause a deformation of the flexible surface in a direction that is not aligned with a direction in which the virtual element is scrolled.

20. The method of claim 18, wherein the behavior includes scrolling of the virtual element on the screen, and wherein representing the behavior comprises triggering the haptic output device to cause a deformation of the flexible surface based on a simulated physical interaction of the flexible surface with a portion of the virtual element that is scrolled off the screen.

\* \* \* \* \*